（12）United States Patent
Siders et al.

(10) Patent No.: US 10,317,084 B2
(45) Date of Patent: Jun. 11, 2019

(54) ADDITIVE LAYER MANUFACTURING FOR FUEL INJECTORS (71) Applicant: Rolls-Royce plc, London (GB)

(72) Inventors: Randall D. Siders, West Des Moines, IA (US); Matthew Donovan, West Des Moines, IA (US); Neal Thomson, West Des Moines, IA (US); David H. Bretz, West Des Moines, IA (US)

(73) Assignee: Rolls-Royce plc (GB)

( * ) Notice: Subject to any disclaimer, the term of this patent is extended or adjusted under 35 U.S.C. 154(b) by 516 days.

(21) Appl. No.: 14/948,986

(22) Filed: Nov. 23, 2015

(65) Prior Publication Data

US 2017/0146243 A1    May 25, 2017

(51) Int. Cl.
F23R 3/14     (2006.01)
F02C 3/04     (2006.01)
F23R 3/28     (2006.01)
F23R 3/34     (2006.01)

(52) U.S. Cl.
CPC .............. *F23R 3/286* (2013.01); *F02C 3/04* (2013.01); *F23R 3/14* (2013.01); *F23R 3/28* (2013.01); *F23R 3/343* (2013.01); *F23D 2900/00018* (2013.01); *F23R 2900/00018* (2013.01)

(58) Field of Classification Search
CPC .... F23R 3/04; F23R 3/14; F23R 3/286; F23R 2900/00018; F23D 2213/21; F05D 2230/21; B33Y 10/00; B33Y 80/00; B33Y 99/00
See application file for complete search history.

(56) References Cited

U.S. PATENT DOCUMENTS

| 6,269,540 | B1 | 8/2001 | Islam et al. |
| 7,984,547 | B2 | 7/2011 | Steinhardt |
| 2006/0073348 | A1* | 4/2006 | Farmer ................... C09D 5/44 428/457 |

(Continued)

FOREIGN PATENT DOCUMENTS

| EP | 1087178 A1 | 3/2001 |
| EP | 1707873 A1 | 10/2006 |

(Continued)

OTHER PUBLICATIONS

Extended European Search Report, European Application No. 16196714. 6-1605, search completed Apr. 13, 2017, 5 pages.

*Primary Examiner* — Carlos A Rivera
(74) *Attorney, Agent, or Firm* — Barnes & Thornburg LLP (57) ABSTRACT An air swirler has a radially outer wall bounding an annular passage. The radially outer wall has an axially extending portion and a radially convergent portion which converges towards an outlet of the passage. Downstream of the outlet, the passage facing surface of the radially outer wall becomes divergent. The region in which the passage facing surface of the radially outer wall is convergent then divergent defines the flare. A circumferential and axially extending recess is provided in the radially outer wall opposite the flare. A reinforcement of material with superior wear properties to the material of the main body is built in the recess to a radius which coincides with that of the outer surface of the axially extending portion of the radially outer wall. The reinforcement can conveniently be added to the main body by means of a laser consolidation ALM process.

15 Claims, 5 Drawing Sheets

(56) References Cited

U.S. PATENT DOCUMENTS

| | | | |
|---|---|---|---|
| 2009/0139237 A1 | 6/2009 | Sullivan et al. | |
| 2010/0287946 A1* | 11/2010 | Buelow | F23R 3/14 |
| | | | 60/776 |
| 2013/0227951 A1 | 9/2013 | Krichever et al. | |
| 2013/0298403 A1 | 11/2013 | Thomson et al. | |
| 2017/0059163 A1* | 3/2017 | Ott | B22F 3/1055 |

FOREIGN PATENT DOCUMENTS

| | | |
|---|---|---|
| EP | 2592351 A1 | 5/2013 |
| WO | 2015112385 A1 | 7/2015 |

\* cited by examiner

ADDITIVE LAYER MANUFACTURING FOR FUEL INJECTORS

FIELD OF THE DISCLOSURE

The subject disclosure relates to lean direct injection fuel nozzles, more particularly to a novel air swirler component having locally enhanced wear properties and the fabrication and assembly of the novel air swirler for use therein.

BACKGROUND AND RELATED ART

Increased regulation of emissions from gas turbine engines has prompted the development of thermally efficient and reduced emission fuel injectors. It is known that carbon monoxide (CO) and unburned hydrocarbons (UHC) emissions can be reduced with high temperature combustion in the engine. However, high temperature combustion can result in increased production of nitrogen oxides ($NO_X$). This problem has been addressed by injectors which are configured more thoroughly to mix fuel with air prior to combustion with a fuel-to-air ratio below the stoichiometric level. Such arrangements can provide a "lean burn" which results in lower flame temperatures than would occur with stoichiometric burning. Since the production of $NO_X$ is a strong function of temperature, a reduced flame temperature or "lean burn" results in lower levels of $NO_X$.

Staged fuel injection is known to result in reduced engine emissions. In such arrangements, the combustion process is divided into two (or more) zones or stages. These stages are typically physically separate from each other, but close enough to permit interaction. Separation can be axial and/or radial separation. A first, pilot stage is configured to provide fuel for low power operations. In higher power conditions, the pilot continues to provide fuel to the engine and in addition a second, main stage provides the remaining fuel needed for engine operation. In this way, proper fuel-to-air ratios can be controlled for efficient combustion, reduced emissions, and good stability.

Along with staged combustion, pollutant emissions can be reduced by providing a more thoroughly mixed fuel-air mixture prior to combustion wherein the fuel-to-air ratio is below the stoichiometric level so that the combustion occurs at lean conditions. Lean burning results in lower flame temperatures than would occur with stoichiometric burning. Since the production of $NO_X$ is a strong function of temperature, a reduced flame temperature results in lower levels of $NO_X$. The technology of directly injecting liquid fuel into the combustion chamber and enabling rapid mixing with air at lean fuel-to-air ratios is called lean direct injection (LDI).

Components of the nozzle which sit furthest into the combustion chamber are exposed to extreme mechanical and thermal loading and are consequently provided from high performance alloys. The combustion chamber is sealed around the fuel injector to prevent leakage of combustor product upstream of the gas turbine engine.

Additive layer manufacturing (ALM) methods are known. In these methods a component is built up layer by layer until the 3D component is defined. In some ALM methods, layers are created by selective treatment of layers within a mass of particulate material, the treatment causing cohesion of selected regions of particulates into a solid mass. For example, the particulate is a ferrous or non-ferrous alloy powder and the treatment involves local heating using a laser or electron beam. Specific examples of such ALM methods include (without limitation); laser sintering, laser melting and electron beam melting (EBM).

Laser consolidation is a known method of manufacturing, repairing or restoring blades of gas turbine engines. The process involves creating a melt pool at a metal surface using a laser. A metal or ceramic powder is delivered by a nozzle into the melt pool and three-dimensional geometry is built up. U.S. Pat. Nos. 6,269,540 and 7,984,547 describe examples of this process. U.S. Patent Application Publication No. 2013/0298403 describes the use of such a process to strengthen components of a fuel injector by adding local patches of a second (mechanically stronger) material to areas of weakness identified on a main body of the component. The specific description therein is particularly directed to outer surfaces of the feed arm.

There is a desire to increase the operational life of staged fuel injectors.

SUMMARY

The present disclosure may comprise one or more of the following features and combinations thereof.

In one aspect, the disclosure provides an annular air swirler for arrangement outboard of a main fuel swirler and inboard of a combustor seal in the combustion section of a gas turbine engine, the annular air swirler comprising a radially outer wall and a radially inner wall defining an annular swirler passage therebetween, the radially inner wall having a passage facing surface comprising an axially extending section and a radially convergent section, the radially convergent section terminating at an outlet to the passage, the radially outer wall having a passage facing surface comprising an axially extending section and a radially convergent section terminating at an outlet to the passage and a radially diverging section extending axially downstream of the passage outlet, a radially outwardly facing surface of the radially outer wall having, in a region opposite the converging and diverging sections, a circumferential and axially extending reinforcement comprising a material of greater wear resistance than that of the remainder of the air swirler.

In the context of the claim, the terms "upstream" and "downstream" should be understood to refer to the direction of flow of fuel and air through the nozzle, typically this will be the same as the direction of flow of a working fluid passing through a gas turbine engine in which the injector is incorporated. In the context of the claim, the term "radially" should be understood to refer to a radius with respect to a common centerline around which the annular components described are arranged.

The convergent/divergent section of the radially outer wall of the swirler is sometimes known as the flare. In a gas turbine engine, the flare on a fuel nozzle interfaces with the combustor seal of the combustor. The inventors have appreciated that local loading and relative motion between the flare and the seal subject the flare to high material wear rates not experienced in other regions of the component. Where the swirler comprises a single component, this wear can reduce the operational life of the entire component.

An option is to fabricate the entire flare out of a wear resistant material however this significantly increases material and processing costs for the component. Such an arrangement involves separate manufacturing processes for the two components of the swirler wall and a third joining operation. The disclosure as claimed herein provides a solution which enables the problem of wear to be solved with a simple, low cost manufacturing operation and cost efficient use of materials. Only the region most affected by wear is reinforced with the higher wear resistant material, a lower cost material which is sufficient to meet the operational requirements for the remainder of the air swirler can be used to provide a main body of the swirler. The result is a lower cost component with an increased operational life.

The radially outer wall of the air swirler can conveniently be manufactured in two stages, the first stage producing a main portion of the wall having a passage facing surface comprising an axially extending section and a radially convergent section terminating at an outlet to the passage and a radially diverging section extending axially downstream of the passage outlet, and a radially outwardly facing surface of the radially outer wall having, in a region opposite the converging and diverging section a circumferential and axially extending radial recess. The second stage comprising adding the reinforcement using an additive layer manufacturing (ALM) process. A preferred ALM method is laser consolidation. The recess of the main portion of the air swirler can serve as a plane from which to build the reinforcement.

A benefit of the disclosure is that, where wear of the reinforcement does occur, the flare can easily be repaired by repeating the ALM process to rebuild worn areas of the reinforcement. This further increases the operational life of the component.

In a second aspect, therefor, the disclosure provides a method for manufacture of an annular air swirler suited to arrangement outboard of a main fuel swirler and inboard of a combustor seal in the combustion section of a gas turbine engine, the method comprising: a) providing an air swirler main body from a first material, the main body comprising a radially outer wall and a radially inner wall defining an annular swirler passage therebetween, the radially inner wall having a passage facing surface comprising an axially extending section and a radially convergent section, the radially convergent section terminating at an outlet to the passage, the radially outer wall having a passage facing surface comprising an axially extending section and a radially convergent section terminating at an outlet to the passage and a radially diverging section extending axially downstream of the passage outlet, a radially outwardly facing surface of the radially outer wall having, in a region opposite the converging and diverging sections, a circumferential and axially extending recess; b) using an ALM process, depositing into the recess a circumferential and axially extending reinforcement of a second material, the second material having superior wear resistance to the first material.

For example, step a) may involve a casting process. The casting process may be an investment casting process. In an alternative, step a) involves an ALM method using a first material. The reinforcement may then be added in step b) using a second material. Optionally the entire component may be provided in a single ALM process, the material being changed in step b) to provide the reinforcement.

In another aspect, the disclosure comprises a lean direct injection fuel nozzle comprising; a pilot fuel injector and main fuel injector arranged in a staged configuration, the pilot fuel injector arranged radially inboard of the main fuel injector and the pilot fuel injector comprising a pilot fuel swirler arranged about an axis and a pilot air swirler arranged coaxial with and radially outboard of the pilot fuel swirler, the main fuel injector comprising an inner main air swirler arranged radially between the pilot air swirler and a main fuel swirler and an outer main air swirler arranged radially outboard of the main fuel swirler, each of the fuel swirlers and air swirlers having a radially extending wall comprising an axially extending portion and a portion which converges or diverges radially at a downstream end of the wall towards an outlet, the outlet of the air swirler axially displaced from the outlet of the radially inner fuel swirler in a downstream direction, wherein the outer main air swirler is configured in accordance with the above described disclosure.

In another aspect, the disclosure comprises a gas turbine engine incorporating a lean direct injection fuel nozzle as referred to above.

These and other features of the present disclosure will become more apparent from the following description of the illustrative embodiments.

BRIEF DESCRIPTION OF DRAWINGS

Some embodiments of the disclosure will now be further described with reference to the accompanying Figures in which;

FIGS. 4(a) and 4(b) illustrate an embodiment of an air swirler in accordance with the disclosure;

DETAILED DESCRIPTION OF DRAWINGS

For the purposes of promoting an understanding of the principles of the disclosure, reference will now be made to a number of illustrative embodiments illustrated in the drawings and specific language will be used to describe the same.

Figure 1:
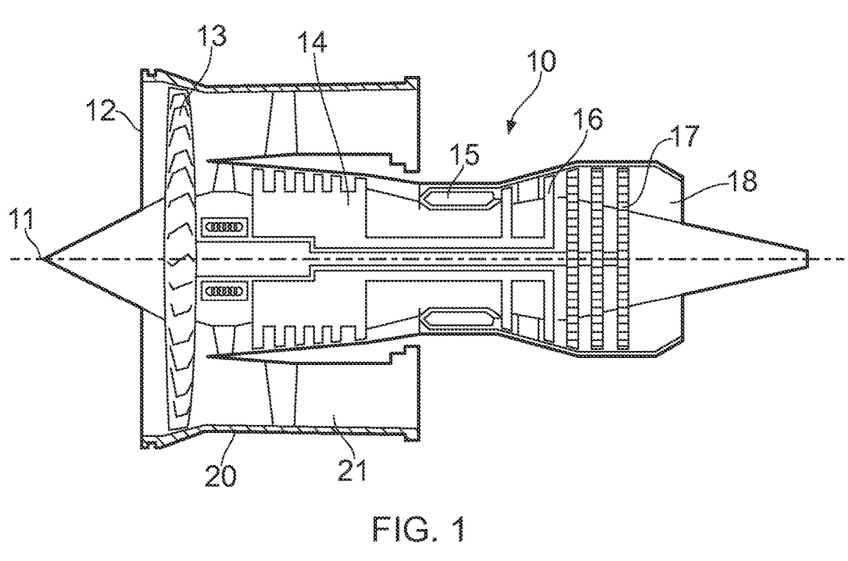
FIG. 1 shows a sectional side view of a gas turbine engine as is known from the prior art.

With reference to FIG. 1, a gas turbine engine is generally indicated at 10, having a principal and rotational axis 11. The engine 10 comprises, in axial flow series, an air intake 12, a propulsive fan 13, a high-pressure compressor 14, combustion equipment 15, a high-pressure turbine 16, a low-pressure turbine 17 and an exhaust nozzle 18. A nacelle 20 generally surrounds the engine 10 and defines the intake 12.

The gas turbine engine 10 works in the conventional manner so that air entering the intake 12 is accelerated by the fan 13 to produce two air flows: a first air flow into the high-pressure compressor 14 and a second air flow which passes through a bypass duct 21 to provide propulsive thrust. The high-pressure compressor 14 compresses the air flow directed into it before delivering that air to the combustion equipment 15.

In the combustion equipment 15 the air flow is mixed with fuel and the mixture combusted. The resultant hot combustion products then expand through, and thereby drive the high and low-pressure turbines 16, 17 before being exhausted through the nozzle 18 to provide additional propulsive thrust. The high 16 and low 17 pressure turbines drive respectively the high pressure compressor 14 and the fan 13, each by suitable interconnecting shaft.

Other gas turbine engines to which the present disclosure may be applied may have alternative configurations. By way of example such engines may have an alternative number of interconnecting shafts (e.g. three) and/or an alternative number of compressors and/or turbines. Further the engine may comprise a gearbox provided in the drive train from a turbine to a compressor and/or fan. The engine may be configured as a turbojet engine. The disclosure is applicable to any of this variety of engine configurations.

Figure 2:
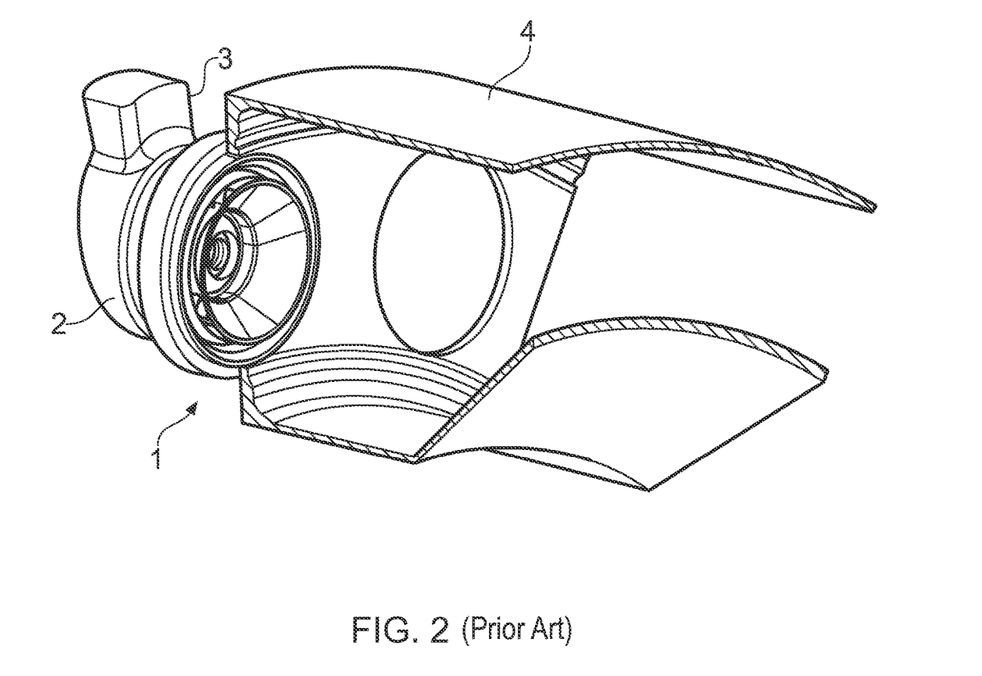
FIG. 2 shows a perspective view of a lean direct injection fuel nozzle as is known from the prior art shown within the combustion chamber of a gas turbine engine.

Within the combustion equipment sits one or more fuel injection nozzles which for example, have the configuration of a lean direct injection fuel nozzle as shown in FIG. 2. FIG. 2 shows a lean direct injection fuel nozzle arranged within a combustion chamber of a gas turbine engine, for example combustion chamber 15 of the gas turbine engine 10 of FIG. 1.

Lean direct injection fuel nozzle 1 is a staged injector configured to provide lean combustion and low pollutant emissions. A pilot fuel delivery system and a main fuel delivery system are integrated into a single fuel nozzle. During high power operation, both the pilot stage and the main stage are fueled, the pilot stage providing good flame stability within the combustion chamber 4. During lower power operation, only the pilot combustion zone is fueled. Combustion is achieved within the combustion chamber 4 in a fuel-lean mode. Typically around 60-70% of the combustion air flows through the injector, the balance of the air used for cooling of combustor components.

A nozzle body 2 issues an atomized fuel/air mixture into the combustion chamber 4. The body 2 depends from an end of an elongated feed arm 3 through which fuel is delivered to the pilot and main injectors.

Figure 3:
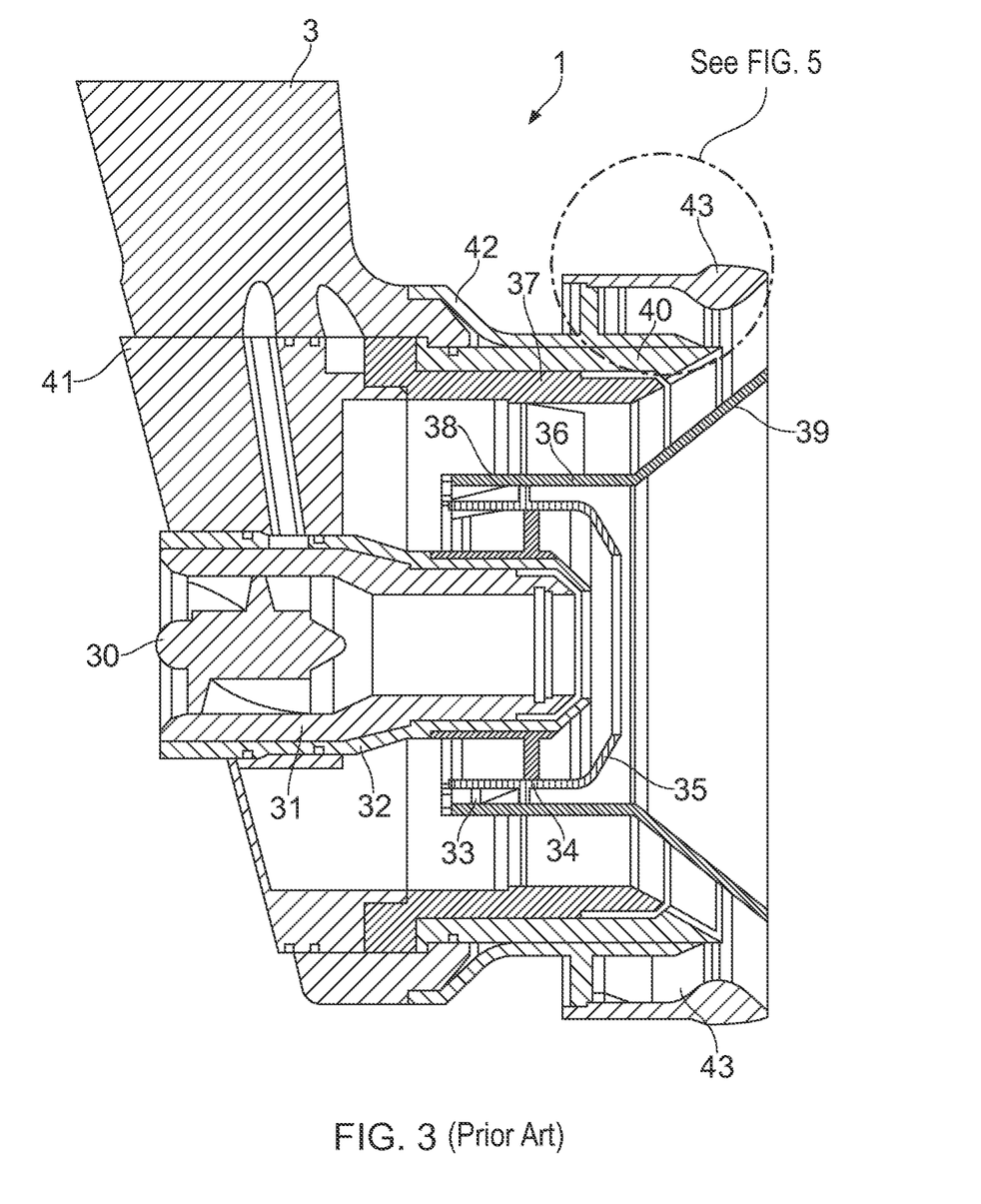
FIG. 3 shows a side elevational view of a lean direct injection fuel nozzle of the sort shown in FIG. 2.

FIG. 3 shows a section through the lean direct injection fuel nozzle 1. In the arrangement shown, a central air swirler 30 sits on an axis of lean direct injection fuel nozzle 1. A radially outer wall of the swirler 31 defines the radially inner wall of a pilot fuel swirler which is also bounded by pilot fuel swirler wall 32. A second (intermediate) air swirler sits radially outboard of the pilot fuel swirler wall 32 and is bounded by intermediate air swirler wall 33 which has an axially extending portion 34 and a radially converging portion 35. Outboard of the intermediate swirler wall 33 is a main air swirler bounded by radially inner main air swirler wall 36 and radially outer main air swirler wall 37. Radially inner air swirler wall 36 has an axially extending portion 38 and a radially diverging portion 35. Radially outer main air swirler wall 37 and a radially adjacent wall 40 together define a main fuel swirler. Radially outboard of the main fuel swirler is a second main air swirler defined by walls 42 and 43. A mounting fixture 41 mounts the assembly within the combustor inlet and includes fuel conduits to deliver fuel from the fuel arm to the fuel circuitry in the main and pilot fuel swirlers.

Figure 4A:
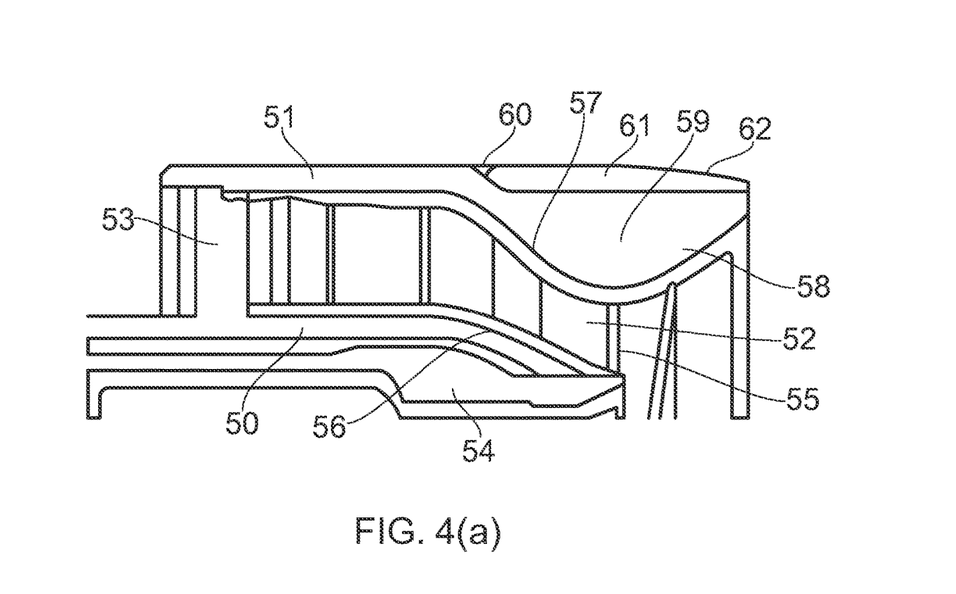
FIG. 4(a) shows a section through the air swirler.
Figure 4B:
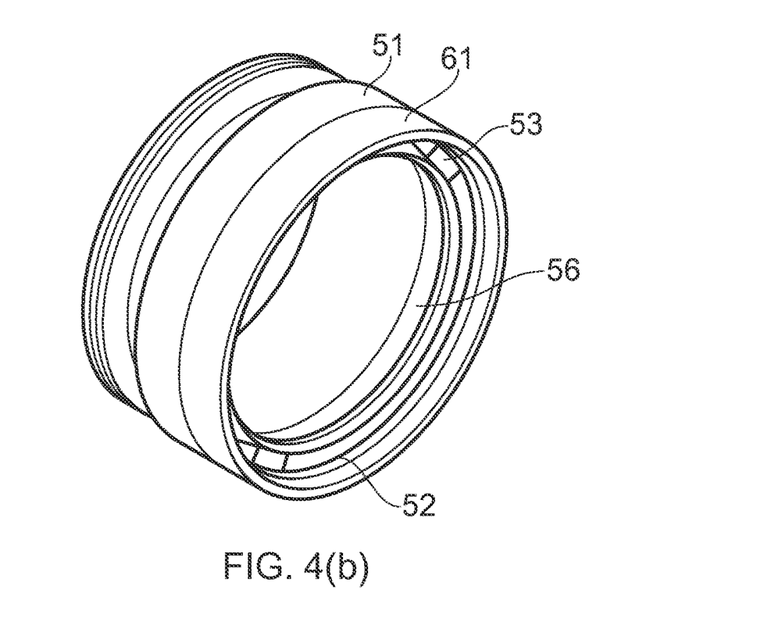
FIG. 4(b) shows a perspective view from the downstream end of the air swirler.

FIG. 4(a) illustrates a section through an axis of an annular air swirler in accordance with the disclosure. The air swirler is configured for fitting into a lean direct injector fuel nozzle substantially of the form illustrated in FIG. 3. The section shown corresponds to a section circled in FIG. 3.

As can be seen in the prior art of FIG. 3, the radially outer wall is formed in a single piece from one material. In FIG. 4(a), an air swirler in accordance with the disclosure comprises a radially inner wall 50 and a radially outer wall 51 defining an annular passage 52 therebetween. An array of swirler vanes 53 extend from a passage facing wall of the radially inner wall 50 and span the passage 51 to meet a passage facing surface of the radially outer wall 51. When incorporated into a fuel nozzle, the radially inner wall 50 is radially adjacent an outer wall 54 of a main fuel swirler. The passage has an outlet 55 at a downstream end. On their passage facing surfaces, each of the radially inner and radially outer wall 50, 51 have an axially extending portion and a radially convergent portion 56, 57 which converges towards the outlet 55. Downstream of the outlet, the passage facing surface of the radially outer wall 51 becomes divergent 58. The region in which the passage facing surface of the radially outer wall is convergent then divergent defines the flare 59.

On a radially outer surface, the radially outer wall is defined by a main body having a circumferential and axially extending recess 60 extending from a downstream end of the radially outer wall and axially across the flare 59 region. The reinforcement 61 of material with superior wear properties to the material of the main body is built in the recess 60 to a radius which coincides with that of the outer surface of the axially extending portion of the radially outer wall 51. Whilst not essential, the reinforcement tapers towards the downstream end of the flare 59. It will be appreciated that the resulting profile of the swirler radial outer wall is substantially the same as that of the prior art shown in FIG. 3. Thus the air swirler can be accommodated into already existing combustor geometries and optional retrofit in place of prior art swirler designs.

Figure 5:
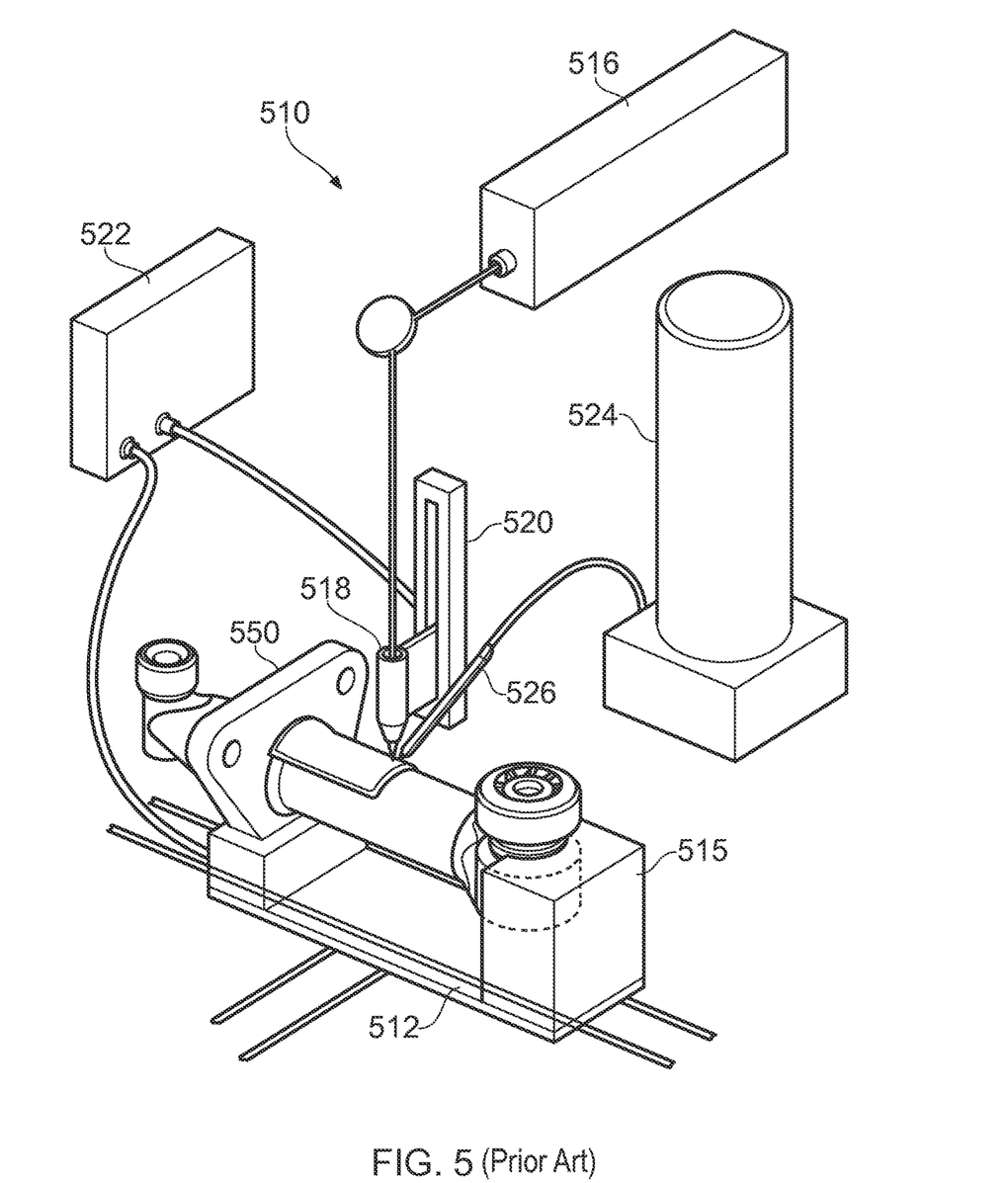
FIG. 5 illustrates apparatus used for a laser deposition process, more specifically the laser deposition process described in U.S. Patent Application Publication No. 2013/0298403.

A laser consolidation ALM process can be used to build the reinforcement 61 into the recess 60. The following describes an example of such an ALM process which is known from U.S. Patent Application Publication No. 2013/0298403. The work piece shown in the figure is a feed arm as described in U.S. Patent Application Publication No. 2013/0298403, it will be appreciated no inventive effort is required to replace the feed arm with a swirler main body in accordance with the disclosure.

In FIG. 5 a suitable system for performing a laser consolidated ALM process to build the reinforcement is shown in schematic and is designated generally by reference numeral 500. Such a system would be typically housed in a sealed chamber (not shown). The system 500 includes a CNC motion controlled two axis stage 512. A work piece 550 is supported in a cradle 515. The two axis stage 512 is moveable in a controlled manner to translate the work piece 550 in relative X and Y planes. A laser 516 is supported on a CNC motion controlled vertical stage 520 which is mounted for movement in a Z plane relative the X and Y planes. The laser includes focusing optics 518.

For example, the laser is a Nd:YAG laser (500 W or 1000 W), or an equivalent thereof. A pulse or continuous laser may be used.

Movement of the two axis stage 512 and the vertical stage 520 is controlled by a computer guided motion controller 522. The controller may be pre-programmed with a set of instructions relating to the production of the reinforcement. A powder feeder 524 delivers metallic powder to a nozzle 526. The laser 516/518 interacts with the powdered metal causing the powder locally to melt and form a melt pool. The melt pool is deposited onto the work piece 550 (the recess of the main body of the air swirler). The work piece 550, by means of two axis stage 512, is moved in an X-Y plane. The melt pool is thus moved away from the laser and can solidify whilst a new melt pool is deposited. Thus, a trail of solid metal can be deposited across the entire surface of the recess. By moving the laser 516/518 in the Z plane, by means of the vertical stage 520, layers of the metal can be deposited one on top of another.

In a more complex arrangement, relative motion of the laser with respect to the work piece can be achieved in multiple dimensions, For example by means of a five-axis motion system which, in addition to the two axis stage 512, comprises a two-axis (B-C) tool orientation head for angling and rotating the laser, and a fifth axis (Z) for moving the focusing optics of the laser.

In accordance with the present disclosure, an illustrative air swirler has a radially outer wall 51 bounding an annular passage 52. The radially outer wall 51 has an axially extending portion and a radially convergent portion 57 which converges towards an outlet 55 of the passage 52. Downstream of the outlet, the passage facing surface of the radially outer wall 51 becomes divergent 58. The region in which the passage facing surface of the radially outer wall is convergent then divergent defines the flare 59. A circumferential and axially extending recess 60 is provided in the radially outer wall opposite the flare 59. A reinforcement 61 of material with superior wear properties to the material of the main body is built in the recess 60 to a radius which coincides with that of the outer surface of the axially extending portion of the radially outer wall 51. The reinforcement 61 can conveniently be added to the main body by means of a laser consolidation ALM process.

The following numbered clauses include embodiments that are contemplated and non-limiting:

Clause 1. A method for manufacture of an annular air swirler suited to arrangement outboard of a main fuel swirler and inboard of a combustor seal in the combustion section of a gas turbine engine, the method comprising; a) providing an air swirler main body from a first material, the main body comprising a radially outer wall and a radially inner wall defining an annular swirler passage therebetween, the radially inner wall having a passage facing surface comprising an axially extending section and a radially convergent section, the radially convergent section terminating at an outlet to the passage, the radially outer wall having a passage facing surface comprising an axially extending section and a radially convergent section terminating at an outlet to the passage and a radially diverging section extending axially downstream of the passage outlet, a radially outwardly facing surface of the radially outer wall having, in a region opposite the converging and diverging sections, a circumferential and axially extending recess; b) using an ALM process, depositing into the circumferential and axially extending recess a circumferential and axially extending reinforcement of a second material, the second material having superior wear resistance to the first material.

Clause 2. The method of any other clause or combination of clauses, wherein step b) is a laser consolidation ALM process.

Clause 3. The method of any other clause or combination of clauses, wherein step a) involves a casting process.

Clause 4. The method of any other clause or combination of clauses, wherein step a) involves an ALM process.

Clause 5. The method of any other clause or combination of clauses, wherein the ALM process is the same ALM process as used in step b), though a different material is deposited for step b).

Clause 6. The method of any other clause or combination of clauses, wherein the reinforcement is built to a radius coincident with the outer radius of the radially outer wall.

Clause 7. The method of any other clause or combination of clauses, wherein the reinforcement tapers towards a downstream end of the radially outer wall.

Clause 8. An annular air swirler for arrangement outboard of a main fuel swirler and inboard of a combustor seal in the combustion section of a gas turbine engine, the annular air swirler comprising a radially outer wall and a radially inner wall defining an annular swirler passage therebetween, the radially inner wall having a passage facing surface comprising an axially extending section and a radially convergent section, the radially convergent section terminating at an outlet to the passage, the radially outer wall having a passage facing surface comprising an axially extending section and a radially convergent section terminating at an outlet to the passage and a radially diverging section extending axially downstream of the passage outlet, a radially outwardly facing surface of the radially outer wall having, in a region opposite the converging and diverging sections, a circumferential and axially extending reinforcement comprising a material of greater wear resistance than that of the remainder of the air swirler, the swirler having been produced by the method of any other clause or combination of clauses.

Clause 9. A lean direct injection fuel nozzle comprising; a pilot fuel injector and main fuel injector arranged in a staged configuration, the pilot fuel injector arranged radially inboard of the main fuel injector and the pilot fuel injector comprising a pilot fuel swirler arranged about an axis and a pilot air swirler arranged coaxial with and radially outboard of the pilot fuel swirler, the main fuel injector comprising an inner main air swirler arranged radially between the pilot air swirler and a main fuel swirler and an outer main air swirler arranged radially outboard of the main fuel swirler, each of the fuel swirlers and air swirlers having a radially extending wall comprising an axially extending portion and a portion which converges or diverges radially at a downstream end of the wall towards an outlet, the outlet of each air swirler axially displaced from the outlet of a radially inner pilot of main fuel swirler in a downstream direction, wherein the outer main air swirler is configured in accordance with any other clause or combination of clauses.

Clause 10. A gas turbine engine incorporating a lean direct injection fuel nozzle of any other clause or combination of clauses.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method for manufacture of an annular air swirler suited to arrangement outboard of a main fuel swirler and inboard of a combustor seal in the combustion section of a gas turbine engine, the method comprising;
   a) providing an air swirler main body from a first material, the air swirler main body comprising a radially outer wall and a radially inner wall defining an annular swirler passage therebetween, the radially inner wall having a passage facing surface comprising an axially extending section and a radially convergent section, the radially convergent section terminating at an outlet to the passage, the radially outer wall having a passage facing surface comprising an axially extending section and a radially convergent section terminating at an outlet to the passage and a radially diverging section extending axially downstream of the passage outlet, a radially outwardly facing surface of the radially outer wall having, in a region opposite the converging and diverging sections, a circumferential and axially extending recess;
   b) using an additive layer manufacturing process, depositing into the circumferential and axially extending recess a circumferential and axially extending reinforcement layer of a second material to form a reinforcement arranged circumferentially around the radially outer wall to provide the annular air swirler such that the provided annular air swirler includes the air swirler main body having the radially outer wall made of the first material and the reinforcement made of the second material and arranged circumferentially around the radially outer wall, the second material having superior wear resistance to the first material.

2. The method as claimed in claim 1 wherein step b) is a laser consolidation additive layer manufacturing process.

3. The method as claimed in claim 1 wherein step a) involves a casting process.

4. The method as claimed in claim 2 wherein step a) involves a casting process.

5. The method as claimed in claim 1 wherein step a) involves an additive layer manufacturing process.

6. The method as claimed in claim 2 wherein step a) involves an additive layer manufacturing process.

7. The method as claimed in claim 5 wherein the additive layer manufacturing process is the same additive layer manufacturing process as used in step b), though a different material is deposited for step b).

8. The method as claimed in claim 1 wherein the reinforcement is built to a radius coincident with an outer radius of the radially outer wall such that no part of the reinforcement extends radially outward beyond the outer radius of the radially outer wall.

9. The method as claimed in claim 2 wherein the reinforcement is built to a radius coincident with an outer radius of the radially outer wall such that no part of the reinforcement extends radially outward beyond the outer radius of the radially outer wall.

10. The method as claimed in claim 3 wherein the reinforcement is built to a radius coincident with an outer radius of the radially outer wall such that no part of the reinforcement extends radially outward beyond the outer radius of the radially outer wall.

11. The method as claimed in claim 5 wherein the reinforcement is built to a radius coincident with an outer radius of the radially outer wall such that no part of the reinforcement extends radially outward beyond the outer radius of the radially outer wall.

12. The method as claimed in claim 7 wherein the reinforcement is built to a radius coincident with an outer radius of the radially outer wall such that no part of the reinforcement extends radially outward beyond the outer radius of the radially outer wall.

13. The method as claimed in claim 1 wherein the reinforcement has a radial outermost surface that tapers radially inward towards a downstream end of the radially outer wall.

14. The method as claimed in claim 2 wherein the reinforcement has a radial outermost surface that tapers radially inward towards a downstream end of the radially outer wall.

15. The method as claimed in claim 8 wherein the reinforcement has a radial outermost surface that tapers radially inward towards a downstream end of the radially outer wall.

* * * * *